United States Patent [19]
Hulyalkar et al.

[11] Patent Number: 5,745,187
[45] Date of Patent: Apr. 28, 1998

[54] METHOD AND APPARATUS FOR COMBATING CO-CHANNEL NTSC INTERFERENCE FOR DIGITAL TV TRANSMISSION USING A BANK OF REJECTION FILTERS

[75] Inventors: Samir N. Hulyalkar, Columbia, Md.; Monisha Ghosh, Mohegan Lake; Aldo G. Cugnini, Ossining, both of N.Y.

[73] Assignee: U.S. Philips Corporation, New York, N.Y.

[21] Appl. No.: 577,685

[22] Filed: Dec. 21, 1995

Related U.S. Application Data

[63] Continuation-in-part of Ser. No. 230,360, Apr. 20, 1994, Pat. No. 5,512,957, which is a continuation-in-part of Ser. No. 197,773, Feb. 10, 1994, Pat. No. 5,452,015.

[51] Int. Cl.$^6$ .............................. H04N 5/21; H04N 5/455
[52] U.S. Cl. .................... 348/607; 348/21; 348/611; 348/726
[58] Field of Search ................ 348/21, 607, 724, 348/726, 608, 609, 610, 611, 614; 455/63, 295, 296, 307; 364/724.01, 724.11; 375/346, 350, 349; H01N 5/21, 5/40, 5/455

[56] References Cited

U.S. PATENT DOCUMENTS

| | | | |
|---|---|---|---|
| 5,282,023 | 1/1994 | Scarpa | 348/624 |
| 5,325,188 | 6/1994 | Scarpa | 348/624 |
| 5,475,444 | 12/1995 | Kim | 348/608 |
| 5,602,602 | 2/1997 | Hulyalkar | 348/607 |

OTHER PUBLICATIONS

Saifuddin et al, Cascaded Combination of Cancelling Co–Channel Interference and Decoding of Error–Correcting Codes for CDMA, IEEE third International Symposium on Spread Spectrum Techniques and Applications (ISSSTA), pp. 171–175, Jul. 4, 1994.

Zenith Electronics Corporation, "VSB Transmission System", Zenith Research and Development, pp. 2–18, and figs. 1–26, Dec. 17, 1993.

*Primary Examiner*—John K. Peng
*Assistant Examiner*—Jeffrey S. Murrell
*Attorney, Agent, or Firm*—Edward W. Goodman

[57] ABSTRACT

A television receiver for reducing a co-channel interference in a digital television signal transmitted by a transmitter, wherein the digital television signal includes an encoded digital television signal component, a co-channel interference component, and a noise component, and wherein a precoder, for which precoding is implemented at the television transmitter, encodes the digital television signal. The receiver includes a receiver for receiving the transmitted digital television signal and for providing a received output signal. A filter block is provided for filtering the received output signal to reduce the co-channel interference component thereof. The filter block includes a plurality of rejection filters and a device for enabling a desired one of the plurality of rejection filters in response to a selection control signal, the enabled rejection filter corresponding to an optimal rejection filter for the precoder for which precoding is implemented at the television transmitter. The filter block provides a filtered output signal. A detector, responsive to the received output signal, is provided for detecting information regarding the precoder. The detector includes a selector for selecting the desired one of the plurality of rejection filters in response to the detected information, and provides the selection control signal for the filter block. Lastly, a device, responsive to the filtered output signal, produces a decoded digital television signal.

22 Claims, 4 Drawing Sheets

METHOD AND APPARATUS FOR COMBATING CO-CHANNEL NTSC INTERFERENCE FOR DIGITAL TV TRANSMISSION USING A BANK OF REJECTION FILTERS

CROSS-REFERENCE TO COPENDING APPLICATIONS

This application is a continuation-in-part of U.S. patent application Ser. No. 08/230,360, filed Apr. 20, 1994, now U.S. Pat. No. 5,512,957 issued Apr. 30, 1996, entitled "Method And Apparatus for Combating Co-channel NTSC Interference for Digital TV Transmission", which is a continuation-in-part of U.S. patent application Ser. No. 08/197,773, filed Feb. 10, 1994, now U.S. Pat. No. 5,452,015, entitled "Method and Apparatus for Combating Co-channel NTSC Interference for Digital TV Transmission", both of which are assigned to the assignee of the present invention, and further, the disclosures of which are incorporated by reference herein. Additional related applications include U.S. patent application Ser. No. 08/271,810, filed Jul. 7, 1994, now U.S. Pat. No. 5,572,249, entitled "Method and Apparatus for Optimal NTSC Rejection Filtering and Transmitter and Receiver Comprising the Same" now U.S. Pat. No. 5,572,249 issued Nov. 5, 1996, U.S. patent application Ser. No. 08/444,484, filed May 19, 1995, now U.S. Pat. No. 5,648,822, entitled "Method and Apparatus for Combating Co-Channel NTSC Interference Using a Variable-Comb Filter For Digital TV Transmission" now U.S. Pat. No. 5,648,822 issued Jul. 15, 1997, and U.S. patent application Ser. No. 08/550,128, filed Oct. 27, 1995, now U.S. Pat. No. 5,602,602 entitled "Method and Apparatus for Combating Co-Channel NTSC Interference For Digital TV Transmission Having a Simplified Rejection Filter" now U.S. Pat. No. 5,602,602 issued Feb. 11, 1997, all assigned to the assignee of the present invention, and further the disclosures of which are incorporated by reference herein.

BACKGROUND OF THE INVENTION

1. Field of the Invention

This invention generally relates to a method and apparatus for combating co-channel NTSC interference for digital TV transmission, and more particularly, to the use of a bank of rejection filters in combating co-channel NTSC interference for digital TV transmission.

2. Discussion of the Related Art

The Federal Communications Commission (FCC) and cable television testing organizations, such as CableLabs, have been evaluating digital television delivery systems in order to choose a new television "standard" which someday will replace NTSC in the United States. These systems all involve digital coding and data compression techniques, for example, those utilizing Motion Picture Experts Group (MPEG) algorithms or variations thereof.

The FCC plans to test and approve an advanced television (ATV) standard for terrestrial broadcasting comprising, for example, high definition television (HDTV) and standard definition television (SDTV) digital signals for terrestrial broadcasting. Although the specifics of the standard are yet to be fully tested and agreed upon, the FCC has indicated that the system will initially take the form of a so called "simulcast" approach. The new HDTV signals will have to fit into currently unused television channels (so-called "taboo" channels) and initially co-exist with conventional analog television signals without co-channel interference.

NTSC will be used hereinafter to represent one example of conventional television broadcasting. Other examples would be SECAM and PAL. Although NTSC is exemplified herein, it is not meant to be construed as a limitation and will be used herein synonymously with "conventional" to represent conventional television in general or other forms of digital communication.

In 1994, the FCC tested a so-called "Grand Alliance" system, a system which is being developed cooperatively by corporate sponsors thereof who were involved in a first round of individual proposals tested by the FCC in 1991 and 1992. This newly developed system proposes to take the best features from those systems already tested. This is being done in order to present a single optimum system for FCC approval as the U.S. standard.

The Grand Alliance has decided on a coding algorithm which will comply with the source coding standards proposed by the MPEG. In addition, an RF transmission approach developed by Grand Alliance member Zenith Electronics Corporation was selected by the Grand Alliance. The RF transmission approach utilizes multi-level vestigial sideband (VSB) modulation which is described in "VSB Transmission System: Technical Details", Feb. 18, 1994.

U.S. Pat. No. 5,512,957, from which the instant application depends, describes an improved approach to combatting co-channel interference. The approach described in this patent utilizes an optimal NTSC "rejection filter" at the receiver in conjunction with an optimal precoder at the transmitter. The use of such a combination of a generalized "rejection" filter and precoder is in contrast to a use of a comb filter in a receiver as proposed by Zenith. The approach of this patent further solves a number of problems and improves performance when both co-channel NTSC and additive white Gaussian noise (AWGN) are present. In addition, a method of using a generalized precoder and a corresponding decoder, for the case when uncoded QAM/VSB modulation is used, is described in "New Automatic Equalizer Employing Modulo Arithmetic", Electronic Letters, pp. 138–139, March 1971, by M. Tomlinson, and in "Matched-Transmission Technique for Channels With Intersymbol Interference", IEEE Transactions on Communications, vol. COM-20, no. 4, pp. 774–780, August 1972, by H. Harashima and H. Miyakawa.

While an improved overall performance of a transmitter/receiver system can be obtained when utilizing an optimal NTSC rejection filter and an associated precoder, it is, however, at the expense of some performance when only AWGN is present and when a co-channel NTSC spectrum is absent. This loss in performance is due to the fact that the NTSC rejection filter is implemented in the receiver at the decoder, which causes noise enhancement as a result of noise also passing through the NTSC rejection filter in the receiver.

Optimal rejection filters with the proposed constraints are disclosed in U.S. Pat. No. 5,512,957 and also in U.S. Pat. No. 5,572,249. The optimal rejection filters were designed to achieve a specific noise enhancement. From simulations, it has been determined that the filters with noise enhancement less than 0.4 dB reduce co-channel interference to a significant extent.

Noise enhancement alone, however, does not specify the overall loss in performance in AWGN. Simulations have shown that this loss in performance in AWGN could be between 0.3–0.8 dB depending on a choice of the trellis code and an amount of desired interference rejection, as disclosed, for example, in U.S. Pat. No. 5,512,957 application of the present invention. This loss in performance in AWGN is justified only when co-channel interference is present. For instances where it can be established that the service area of a particular station is not limited by co-channel interference, it is desirable to be able to remove or significantly reduce this loss.

As described herein above, the loss in performance is a function of the desired interference rejection. For a particular service area, the level of desired co-channel interference rejection can be appropriately determined. Furthermore, for a particular level of desired rejection, as described in U.S. Pat. No. 5,512,957, the generalized "rejection" filter will be different for different amounts of desired co-channel NTSC rejection performance. It is noted, however, that a specific rejection filter implies a specific precoding at the transmitter. That is, the transmitter is dependent on what rejection filter is used at the receiver, and vice versa, as described in "New Automatic Equalizer Employing Modulo Arithmetic". Upon the specification of a specific precoding at the transmitter for a particular service area, it is then necessary, for achieving an optimal performance, that the receiver use a rejection filter for which the precoding was implemented at the transmitter. In an instance where the receiver is not using a rejection filter for which the precoding was implemented at the transmitter, then for achieving an optimal performance, the receiver must be adapted and/or modified so as to use the rejection filter for which the precoding was implemented at the transmitter. Thus it would be desirable for the receiver to be able to determine which rejection filter is being used at the transmitter and for the receiver further to be adapted for use of the same. This further includes an instance in which a rejection filter is not used at the transmitter.

In addition to the above, there may be instances in which the level of co-channel interference for a particular service area varies or fluctuates periodically over time. Such an instance may be as the result of a TV broadcast channel (or channels), which contributes to co-channel interference in the particular service area, being shut-down, for example, at the end of a broadcast day. When the particular TV channel (which contributes to the presence of co-channel interference) is shut-down, the level of co-channel interference is thereby reduced accordingly. In the later case, when co-channel interference is not present, continuing to operate the HDTV system utilizing a particular precoding at the transmitter and correspondingly utilizing the rejection filter at the receiver for which precoding is implemented at the transmitter becomes no longer desirable. A degrading of the reception of the HDTV signal results thereby, since the co-channel interference is no longer present. In addition, the amount of co-channel interference for a service area in a remote setting, such as a rural location in Nebraska, for example, may be vastly different from the amount of co-channel interference for a service area in a major metropolitan area, such as New York City. As a result, the transmitters and the corresponding requirements of the receivers used in each of those settings will thus differ, whereby a receiver designed for use in the rural setting Nebraska may be inadequate for use in New York City.

SUMMARY OF THE INVENTION

An object of the present invention is to provide a receiver capable of adapting to a particular transmitter, and more particularly, to the precoding implemented at the transmitter, the receiver comprising a plurality of rejection filters and further having a means for determining an optimal choice of rejection filter to implement.

Another object of the present invention is to provide a method and apparatus for determination and selection of an optimal choice of rejection filter at the receiver, wherein the selection of the optimal choice is from a bank of rejection filters.

According to the present invention, a television receiver is provided for reducing a co-channel interference in a digital television signal transmitted by a transmitter. The transmitted digital television signal comprises an encoded digital television signal component, a co-channel interference component, and a noise component, wherein a precoder for which precoding is implemented at the television transmitter encodes the digital television signal. The television receiver according to the present invention comprises receiving means for receiving the transmitted digital television signal, the receiver means further providing a received output signal. A filter means filters the received output signal to reduce the co-channel interference component thereof. The filter means comprises a plurality of rejection filters, the filter means further providing a filtered output signal. A detection means, responsive to the received output signal, detects information regarding the precoder, the detection means further comprising selection means for selecting a desired one of the plurality of rejection filters in response to the detected information. The detection means further provides a selection control signal, wherein the filter means further comprises means responsive to the selection control signal for selectively enabling the desired one of the plurality of rejection filters. The enabled rejection filter corresponds to an optimal rejection filter for the precoder for which precoding is implemented at the television transmitter. Lastly, a means responsive to filtered output signal is provided for producing a decoded digital television signal.

In addition, according to the present invention, a method of reducing co-channel interference in a received television signal is described herein. The digital television signal is transmitted by a transmitter, the transmitted digital television signal having an encoded digital television signal component, a co-channel interference component, and a noise component, wherein a precoder for which precoding is implemented at the television transmitter encodes the digital television signal. The method comprises the steps of receiving the transmitted digital television signal and providing a received output signal; filtering the received output signal to reduce the co-channel interference component thereof, wherein filtering comprises using a desired one of a plurality of rejection filters, further for providing a filtered output signal; detecting information regarding the precoder in response to the received output signal, said detection step further comprising selecting the desired one of the plurality of rejection filters in response to the detected information, further providing a selection control signal, wherein said filtering step further comprises enabling the desired one of the plurality of rejection filters in response to the selection control signal, the enabled rejection filter corresponding to an optimal rejection filter for the precoder for which precoding is implemented at the television transmitter; and producing a decoded digital television signal in response to the filtered output signal.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings in which like reference numerals are carried forward, and in which.

DETAILED DESCRIPTION OF THE PREFERRED EMBODIMENTS

Figure 1:
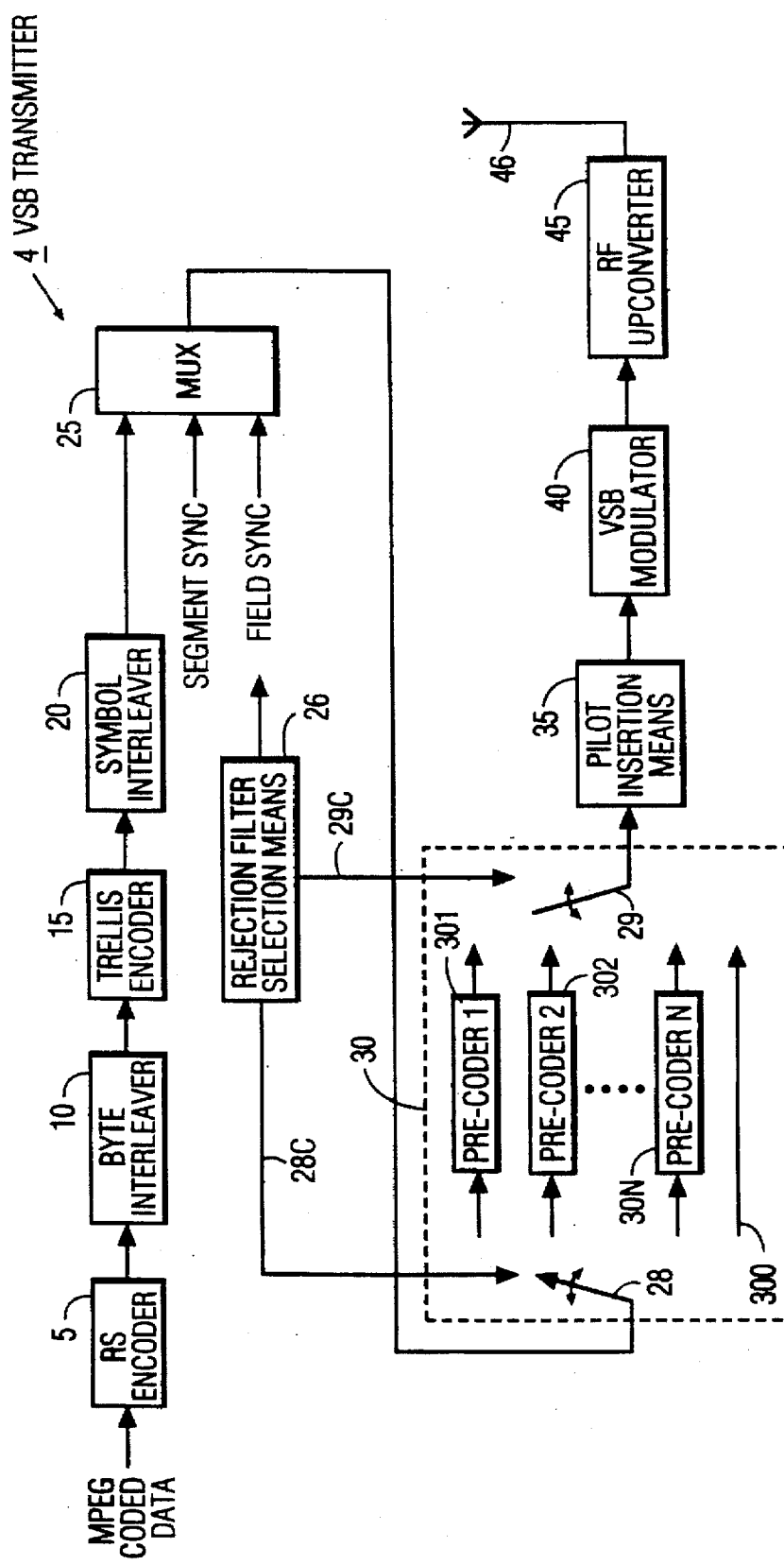
FIG. 1 shows a block diagram of a VSB transmitter.

Turning now to FIG. 1, a VSB HDTV transmitter 4 in accordance with one aspect of the present invention shall be briefly discussed. The VSB transmitter 4 contains a number of components of a VSB transmitter as known and used by the Grand Alliance, as described, for example, in "VSB Transmission System: Technical Details". Briefly, the VSB transmitter 4 operates to transmit an encoded digital television signal. That is, digital data (for example, comprising MPEG encoded television) is passed through a Reed-Solomon (RS) encoder 5 and a byte interleaver 10. The bytes output by the byte interleaver 10 are broken up into symbols and then input into a trellis encoder 15 and subsequently input into symbol interleaver 20.

Referring still to FIG. 1, the output of symbol interleaver 20 is passed through a multiplexer (MUX) 25. In addition to the output of symbol interleaver 20, MUX 25 also multiplexes any training signals, for example, a segment sync or a field sync, that may be present in accordance to a particular sequence being transmitted. The output of MUX 25 comprises a multiplexed stream of signals which is then passed through a precoder block 30, as will be discussed further herein below.

In particular, with respect to precoder block 30, the multiplexed stream is sent through a precoder selected from a plurality of precoders (i.e., a bank of precoders). An example of one such precoder is described in more detail herein below with reference to FIG. 4. The selection of a particular choice of precoder to use is made depending upon service and/or coverage area considerations, such as described herein above. For implementing the use of a selected precoder in response to the particular requirements of a given service area, a rejection filter selection means 26 is provided. Rejection filter selection means 26 can comprise any suitable device, such as a microprocessor, microcontroller, and/or discrete circuitry for implementing the desired functions in accordance with known programming and circuit design techniques, for selecting the desired precoder for use and outputting appropriate control signals, further as described herein below. In accordance with one embodiment of the present invention, rejection filter selection means 26 further provides an output for inserting certain prescribed information into the field sync signal. The precoded output of the selected precoder then becomes the output of precoder block 30. While precoder block 30 has been described as comprising a plurality of precoders, it is noted that precoder block 30 may likewise comprise a single precoder for a given transmitter.

Precoder block 30 can comprise, for example, a plurality of N precoders, as exemplified in FIG. 1 by reference numerals 301, 302, ..., and 30N. In addition, precoder block 30 can comprise a branch for implementing a no-precoder option, as shown in FIG. 1 by reference numeral 300. With respect to the no-precoder option, as the wording implies, no precoder is used, further corresponding to an instance in which no precoding of a precoder block input signal occurs. Input switching means 28 and output switching means 29, each comprising any suitable controllable switch, are used for connecting the precoder block input and output, respectively, to a desired precoder of the bank of precoders (including the option of no-precoding). Appropriate control signals for a desired control of switching means 28 and 29 are provided by rejection filter selection means 26 via signal lines 28c and 29c.

The output of precoder block 30 is input into and processed by a pilot insertion means 35. The output of the pilot insertion means 35 is passed through VSB modulator 40 and then RF upconverter 45, after which it is radiated over the desired HDTV terrestrial channel. That is, RF upconverter 45 upconverts its input signal and causes a digital television signal to be radiated, via antenna 46, over the desired HDTV terrestrial channel. The blocks 5, 10, 15, 20, 25, 35, 40, and 45 are known in the art, such as described in "VSB Transmission System: Technical Details", and thus only briefly discussed herein.

Figure 2:
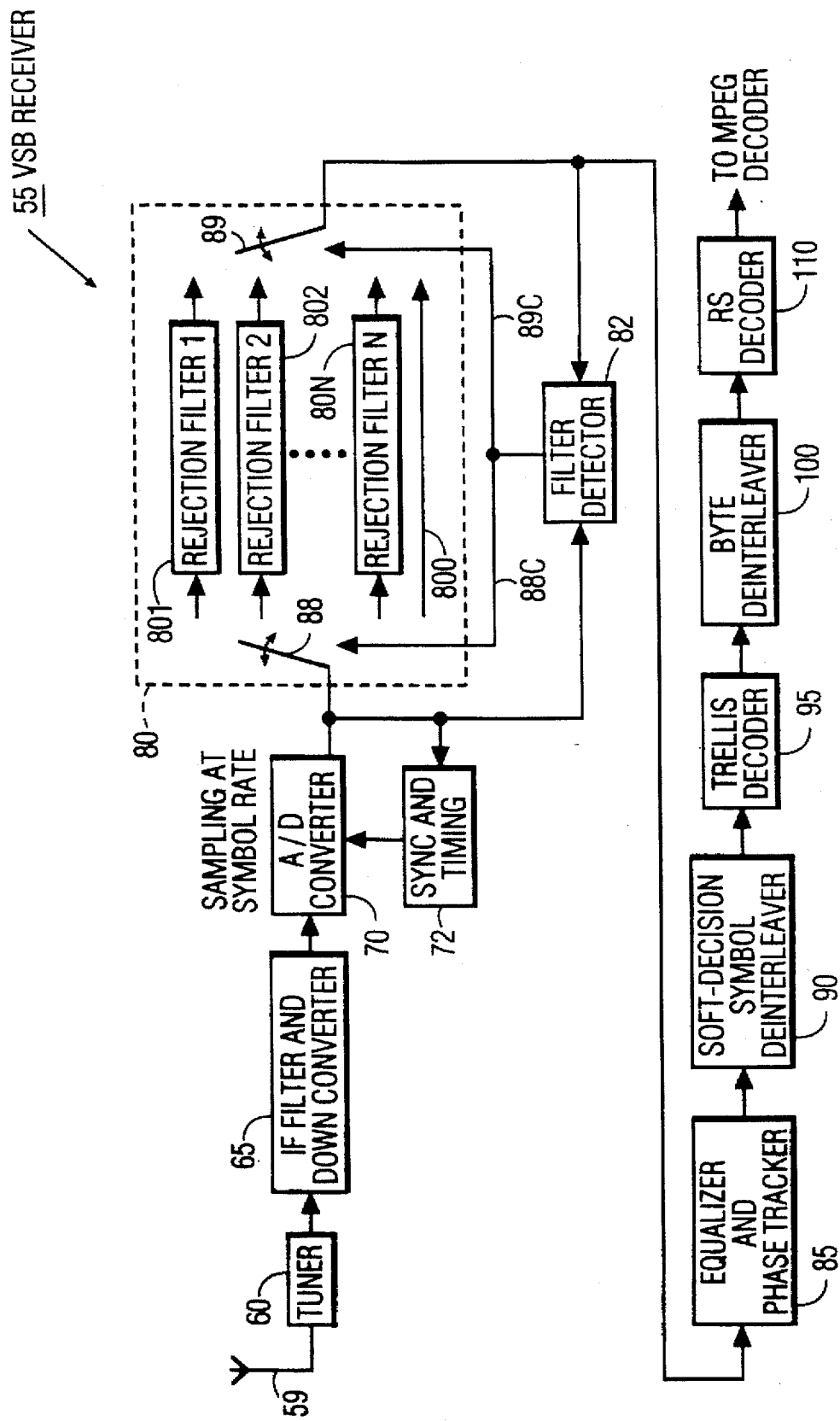
FIG. 2 shows a block diagram of a VSB receiver according to the present invention.

Turning now to FIG. 2, the VSB HDTV receiver 55 and a method of receiving an HDTV signal comprising the present invention shall be discussed. Tuner 60 selects the HDTV channel of interest and converts the received signal, picked up via antenna 59, from RF to IF, wherein the received signal comprises one transmitted by a VSB transmitter as discussed hereinabove. The IF signal is then sent to an IF filter and downconverter 65. IF filter and downconverter 65 can comprise, for example, a SAW filter, which shapes a signal spectrum according to a filter used in the VSB modulator 40, followed by a mixer which downconverts the signal spectrum to a baseband signal. Tuner 60 and IF filter and downconverter 65 are known in the art and thus only briefly discussed herein.

An analog-to-digital (A/D) converter 70 samples the input signal received from IF filter and downconverter 65 at a desired symbol-rate, such as 10.76 MHz. The output of A/D converter 70 is passed through filter block 80, as will be discussed further herein below.

In particular, with respect to filter block 80, the A/D converter output is sent through a rejection filter selected from a plurality of rejection filters (i.e., a bank of rejection filters). An example of one such rejection filter is described in detail herein below with reference to FIG. 3. The selection of a particular choice of rejection filter to be used, from the filter block 80, is made in accordance with the present invention as will be discussed herein below. A rejection filter detection means 82 is provided for implementing a prescribed strategy for determining a choice of rejection filter to be used. The selected rejection filter is chosen in response to an indirect determination of the type of precoding used at the transmitter. Detector 82 further provides selection control signals to filter block 80 for implementation of the appropriate rejection filter. Detector 82 can comprise any suitable device, such as a microprocessor, microcontroller, and/or discrete circuitry for implementing the desired functions in accordance with known programming and circuit design techniques, for selecting the desired rejection filter for use and outputting appropriate control signals, further as described herein below. The filtered output of the selected rejection filter then becomes the output of filter block 80.

Referring still to FIG. 2, filter block 80 comprises, for example, a plurality of N rejection filters, as exemplified by reference numerals 801, 802, ..., and 80N. In addition, filter block 80 can comprise a branch for implementing a no-rejection filter option, as shown in FIG. 2 by reference numeral 800. The rejection filters can comprise any plurality of rejection filters, as desired for a particular receiver, wherein each rejection filter is different from the other, and furthermore, wherein each corresponds to a particular precoder for which precoding is implemented at a transmitter. As can be understood from the background discussion, transmitters for different service areas may utilize different precoders for achieving a desired level of co-channel NTSC interference reduction in the respective service area. With respect to the no-rejection filter option, as the wording implies, no rejection filter is used, further corresponding to an instance in which no filtering of a filter block input signal occurs. Input switching means 88 and output switching means 89, each comprising any suitable controllable switch, are used for connecting the filter block input and output, respectively, to a desired rejection filter of the bank of rejection filters (including the option of no-filtering). Appropriate control signals for a desired control of switching means 88 and 89 are provided by detector 82 via signal lines 88c and 89c. Detector 82 can thus provide appropriate control signals for enabling the use of a desired rejection filter corresponding to the particular precoder for which precoding is implemented at the transmitter.

Filter block 80 processes an output signal of the A/D converter 70 and passes it to an equalizer and phase tracker 85. The output of the equalizer and phase tracker 85 is then passed through a soft-decision symbol deinterleaver 90 and trellis decoder 95. Decoder 95 corresponds to the trellis encoder 15 of the VSB transmitter 4. The output of the trellis decoder 95 is then passed through a byte deinterleaver 100 and an RS decoder 110. Equalizer and phase tracker 85, soft-decision symbol deinterleaver 90, trellis decoder 95, byte deinterleaver 100 and RS decoder 110 are known in the art, as described in "VSB Transmission System: Technical Details", and thus only briefly discussed herein. A synchronizing and timing block 72 controls a clocking for each of the digital signal processing blocks and also the A/D converter 70, as is known in the art.

Figure 3:
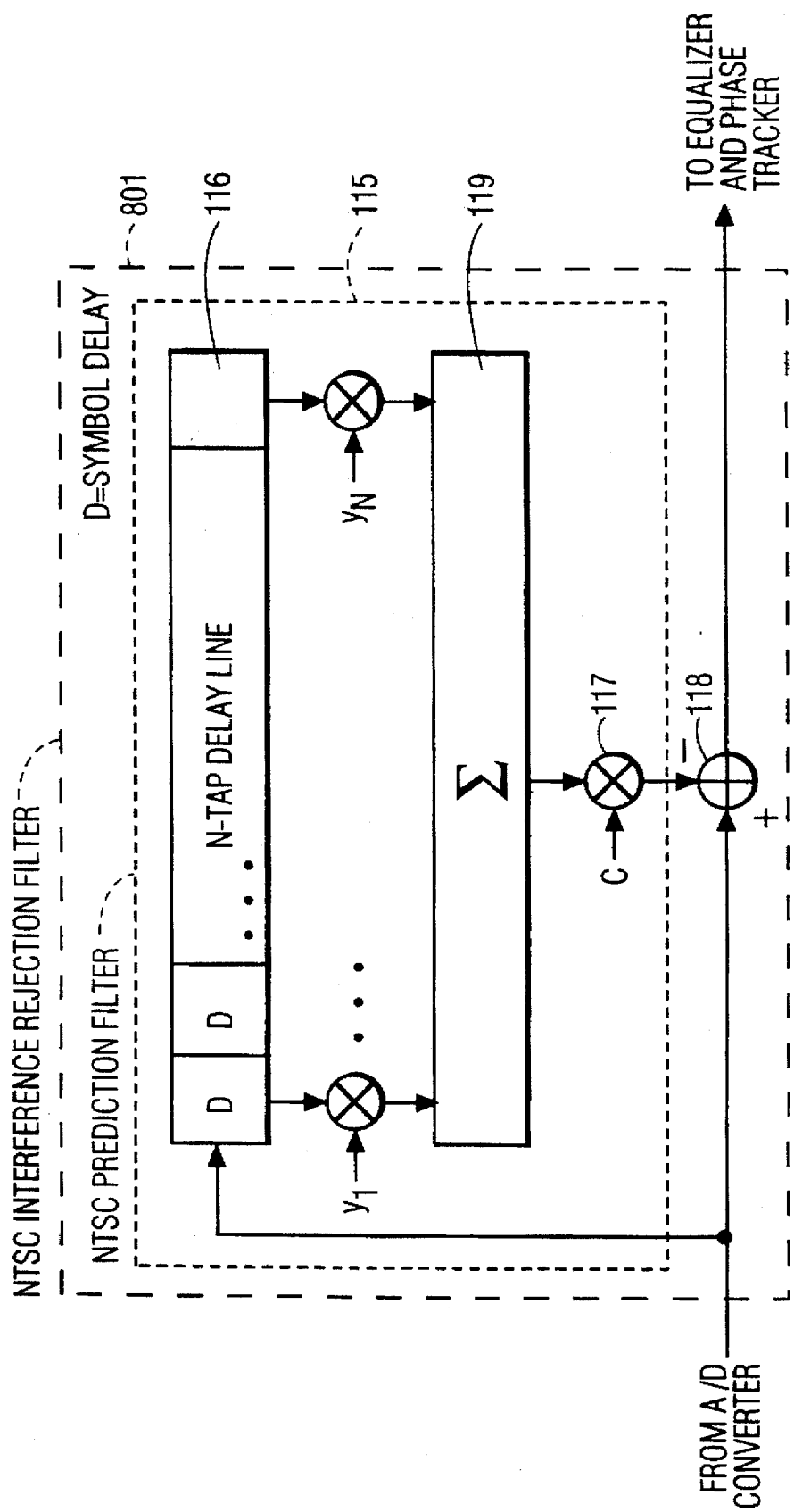
FIG. 3 shows an optimal NTSC interference rejection filter, as disclosed in the parent application.

Referring now to FIG. 3, an NTSC interference rejection filter, such as that indicated by reference numeral 801, will now be described in further detail. Rejection filter 801 comprises an NTSC prediction filter 115. Prediction filter 115 provides estimates on deterministic parts of an interfering NTSC signal, the deterministic parts corresponding, to a reasonable extent, to the region around a picture and an audio carrier of the interfering NTSC signal. An output of prediction filter 115 is subtracted out of a main signal by using a subtracter 118. The NTSC prediction filter 115 further comprises an N-tap delay line 116, wherein each delay D is equal to one symbol interval. One symbol interval is equivalent to the reciprocal of the A/D sampling rate of 10.76 MHz.

Referring still to FIG. 3, the outputs of each of the symbol delays of the N-tap delay line 116 are multiplied by respective filter tap-coefficients $y_1, \ldots, y_N$. The outputs of the delay line 116 times the respective filter tap-coefficients $y_1, \ldots, y_N$ are then summed by summation block 119. After summing the outputs of the delay line times the coefficients of the filter $y_1, y_2, \ldots, y_N$, a final scaling constant C, operating on the sum in multiplier 117, provides the output of the NTSC prediction filter 801. The design of the prediction filter 801, including the manner of determining the coefficients and the scaling constant C, is treated in further detail in the parent application, as well as in U.S. patent application Ser. No. 08/271,810. As discussed in the parent application, a precoder, such as precoder 301, must be implemented in the transmitter 4 if a signal is to be processed by the NTSC rejection filter 801, wherein further precoder 301 includes an NTSC prediction filter similar to prediction filter 115.

Figure 4:
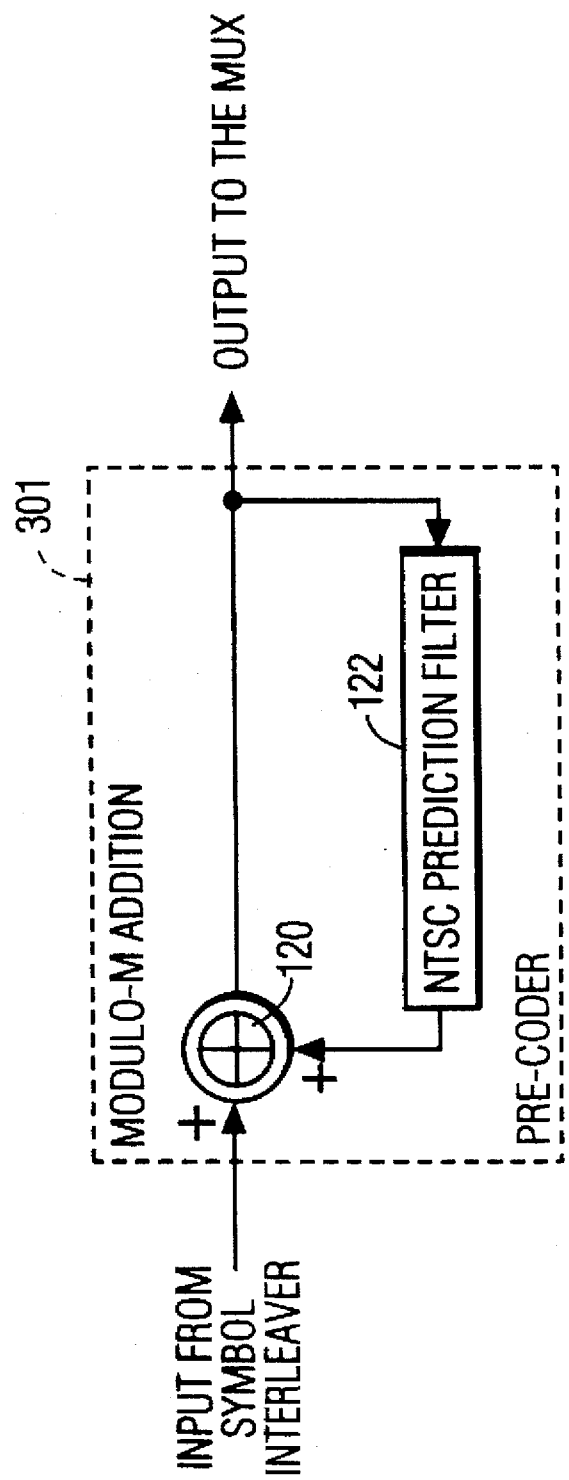
FIG. 4 shows an example of a precoder utilized at the transmitter.

Turning now to FIG. 4, one of the precoders as used in the transmitter 4 will be described in further detail. In precoder 301, the output of the symbol interleaver 20 is passed through a modulo-M adder 120, which adds its output passed through an NTSC prediction filter 122. That is, the output of modulo-M adder 120 is passed through NTSC prediction filter 122 and added to the input of the modulo-M adder 120. The operation of a modulo-M adder is known in the art, for example, as described in "New Automatic Equalizer Employing Modulo Arithmetic", Electronic Letters, pages 138–139, in March 1971, and thus only briefly discussed herein. In addition, the value of M is chosen to be greater than or equal to a peak value of the incoming symbol. NTSC prediction filter 122 comprises a NTSC prediction filter for implementing a desired precoding at the transmitter, for example, an NTSC prediction filter similar to prediction filter 115, or other comparable prediction filter. Prediction filter 115 is discussed above with reference to FIG. 3. As mentioned herein above with respect to the method and apparatus of U.S. Pat. No. 5,512,957, prediction filters 115 and 122, in the receiver and the transmitter, respectively, comprise similar NTSC prediction filters.

An essential part of the present invention is that a bank of rejection filters is used (including the case of using no rejection filter) at the receiver. At the receiver, an appropriate rejection filter is utilized depending on the level of required co-channel interference rejection for a given HDTV service area. Such a choice of which rejection filter to use at the receiver is dictated by a respective transmitter, since the transmitted data must be appropriately precoded at the transmitter.

With respect to choosing an appropriate rejection filter from the bank of rejection filters, two alternatives can arise. In a first alternative, no extra information is available to the receiver from the transmitter as to the precoding strategy implemented at the transmitter. Therefore, the receiver must alone determine which rejection filter to use in a particular situation. For instance, in one embodiment in accordance with the present invention, the determination and selection of the appropriate rejection filter to use is based upon a calculation of a mean-square error using field sync symbols. That is, the mean-square error of field sync symbols, as filtered by each of the plurality of rejection filters, is used in determining the appropriate rejection filter to be used by the receiver, as will be discussed further herein below.

In a second alternative, the transmitter can send or transmit prescribed information which specifies which rejection filter to use in a particular situation. For instance, in accordance with yet another embodiment of the present invention, a method by which such information is provided to the receiver by the transmitter includes the step of passing prescribed information to the receiver through the use of some of the bits in the field sync signal to specify a desired rejection filter.

As indicated above, upon the specification of a specific precoding at the transmitter for a particular service area, it is necessary that the receiver use a rejection filter for which the precoding was implemented at the transmitter for achieving an optimal performance. In an instance where the receiver is not using a rejection filter for which the precoding was implemented at the transmitter, then for achieving an optimal performance, the receiver must be adapted and/or modified so as to use the rejection filter for which the precoding was implemented at the transmitter. In accordance with the present invention, a receiver is provided having a means for determining and selecting an optimal rejection filter from a bank of rejection filters, the selected rejection filter corresponding to one for which precoding is implemented at the transmitter. The receiver thus is efficiently adapted for use with the transmitter of the particular service area, further for reducing a co-channel interference. This also includes an instance in which a rejection filter is not used at the transmitter.

One possible way for addressing the above concern is to provide a receiver, wherein the receiver preselects a specific filter (such as, a default setting) from a bank of filters, and thereafter waits for a predetermined certain amount of time to determine if the receiver operates reliably. If the system operates reliably, then the receiver assumes that it has found or selected the correct filter. If it does not operate reliably, then the receiver selects another filter. This process can be continued until the correct filter is found. Problems, however, exist with this approach, thus rendering the same less desirable. For instance, a worst-case acquisition time for this preselection/reliable operation approach can be quite large (possibly on the order of a few seconds). Also, it is possible that the correct filter may not be found, as the system may operate reliably even with an incorrect filter. The later is possible since the signal-to-noise-ratio (SNR) of the received signal might be large enough for the receiver's equalizer to compensate for the mismatch effects of choosing an incorrect filter. This later compensation by the equalizer is at the expense of a reduced SNR margin. For instance, if the received signal suddenly goes through a fade, the system with a mismatched filter may become unreliable, while a system with the correct filter may still be reliable.

An improvement to the method described in the preceding paragraph is one in which the receiver obtains information regarding the precoder being used in a particular transmitter from the periodically transmitted field sync symbols (alternatively, field sync signal) or training sequence. That is, the transmitter periodically transmits the field sync signal and/or the training sequence in its normal operation, wherein the transmitted field sync signal and the training sequence are received by the receiver, as will be discussed herein below. The field sync and training sequence signals are known in the art, as described in "VSB Transmission System: Technical Details", and thus only briefly described herein. With respect to the field sync signal and/or the training sequence, information regarding the precoder can be obtained by calculating the mean-square-error between (i) the known field sync signal and/or training sequence and (ii) the received signal, subsequent to the received signal being processed by each of the different rejection filters of the bank of rejection filters. Calculation of the mean-square-error can be carried out using known techniques, wherein said calculations are preformed using filter detector 82. Determination of the optimal rejection filter would then correspond to that rejection filter which yielded the smallest mean-square-error. This method is also applicable for detecting an instance in which no filtering strategy (i.e., no precoding) was implemented at the transmitter, thus corresponding to the receiver being adjusted such that the filtering strategy includes no rejection filter.

In the method, as discussed in the previous paragraph, the field sync symbols are used to determine which filtering strategy is to be selected and used at the receiver. Referring to FIG. 2, the mean-square error between a received signal sequence and the field sync symbols can be calculated at the output of each rejection filter, wherein the calculations are carried out by filter detector 82. The rejection filter to be used, corresponding to the precoding strategy used by the transmitter, is thus selected based upon which of the mean-square error calculations resulted in the smallest mean-square error. Filter detector 82 also provides appropriate control signals on lines 88c and 89c for selecting the rejection filter for which the mean-square error calculation resulted in the smallest mean-square error.

For the case when a decision is to be made between whether a rejection filter is to be used or not, the mean-square error between the known training sequence, for instance, and the received signal, before the filter (i.e., the received signal before being filtered), is calculated. If the resultant error is large, then a filtering strategy has been used. Otherwise, no filter has been used at the transmitter.

Another method in accordance with the present invention relies on the transmitter to send certain prescribed information about the choice of the rejection filter to the receiver, such that the receiver is able to accurately determine the choice of the rejection filter with high reliability. In accordance with this method, information about the specific filtering strategy being implemented at the transmitter can be sent by using reserved data bits within the field sync signal. The reserved data bits of the field sync signal, however, can be decoded at the receiver only if the timing and carrier recovery are operational. It is preferable that a large number of symbols (on the order of 15–20 symbols) are used to provide the filter strategy identification information. In this way, the specific filtering strategy can be accurately determined at the receiver.

For carrier recovery, the frequency and phase-offset can be tracked accurately by using the pilot-carrier. Any residual phase noise will still be passed. Since the field sync signal carries only binary information, the phase-noise will not affect the detection performance at the systems threshold of operation and thus can be detected reliably, further provided that accurate timing has been obtained. With respect to timing recovery, there are numerous methods which can be implemented with the Grand-Alliance HDTV system. In "VSB Transmission System: Technical Details", a technique using the periodically sent segment sync symbols is described. This later technique is found to be extremely robust for a variety of extreme channel conditions. It is then possible for timing recovery, using the segment sync symbols, to be operational even in the case of mismatched filters. The later is possible since the rejection filters, such as those described in U.S. patent application Ser. No. 08/271, 810, have small values for the tap-coefficients (other than the main tap-coefficient) as compared to the main tap-coefficient.

Thus there has been shown a method and apparatus for combating co-channel interference for digital transmission which provides a versatile, robust system for meeting the level of required co-channel interference rejection required for a particular service area. The apparatus of the present invention is able to make a determination as to an appropriate rejection filter, selected from a bank of rejection filters, for implementing at the receiver corresponding to a precoder for which precoding is implemented at the transmitter.

While the invention has been particularly shown and described with reference to the preferred embodiment thereof, it will be understood by those skilled in the art that various changes in form and detail may be made therein without departing from the spirit and scope of the invention.

What is claimed is:

1. A television receiver for reducing a co-channel interference in a digital television signal transmitted by a transmitter, the transmitted digital television signal having an encoded digital television signal component, a co-channel interference component, and a noise component, wherein a precoder, for which precoding is implemented at the television transmitter, encodes the digital television signal, said receiver comprising:

means for receiving the transmitted digital television signal, said receiving means further providing a received output signal;

filter means for filtering the received output signal to reduce the co-channel interference component thereof, said filter means comprising a plurality of rejection filters, and means responsive to a selection control signal for selectively enabling a desired one of said plurality of rejection filters, the enabled rejection filter corresponding to an optimal rejection filter for the precoder for which precoding is implemented at the television transmitter, said filter means providing a filtered output signal;

means, responsive to the received output signal, for detecting information regarding the precoder, said detecting means comprising means for selecting the desired one of the plurality of rejection filters in response to the detected information, said detecting means providing the selection control signal; and means responsive to the filtered output signal for producing a decoded digital television signal.

2. The television receiver of claim 1, wherein:

said detecting means detects information regarding the precoder from a field sync signal which is periodically transmitted by the transmitter, said detecting means calculating a mean-square error between a known field sync signal and a received field sync signal contained within the received output signal, the received field sync signal being utilized in the mean-square error calculation subsequent to the received field sync signal being processed by each of the rejection filters of the plurality of rejection filters, and determining the optimal rejection filter corresponding to that rejection filter which produced a smallest mean-square error of the calculated means-square errors.

3. The television receiver of claim 1, wherein:

said detecting means detects information regarding the precoder from a training sequence which is periodically transmitted by the transmitter, said detecting means calculating a mean-square error between a known training sequence and a received training sequence contained within the received output signal, the received training sequence being utilized in the mean-square error calculation subsequent to the received training sequence being processed by each of the rejection filters of the plurality of rejection filters, and determining the optimal rejection filter corresponding to that rejection filter which produced a smallest mean-square error of the calculated means-square errors.

4. The television receiver of claim 1, wherein the transmitter provides information regarding the precoder in reserved data bits of the field sync signal, and wherein:

said detecting means further comprises means for decoding symbols of the reserved data bits of the field sync signal, said detecting means selecting the desired one of the plurality of rejection filters in response to the decoded symbols.

5. The television receiver of claim 1, wherein the plurality of rejection filters of said filter means includes a filter path having no rejection filter therein.

6. A method for reducing a co-channel interference in a digital television signal transmitted by a transmitter, the transmitted digital television signal having an encoded digital television signal component, a co-channel interference component, and a noise component, wherein a precoder, for which precoding is implemented at the television transmitter, encodes the digital television signal, said method comprising the steps:

receiving the transmitted digital television signal and providing a received output signal;

filtering the received output signal to reduce the co-channel interference component thereof, said filtering step comprising using a desired one of a plurality of rejection filters by enabling the desired rejection filter in response to a selection control signal, the enabled rejection filter corresponding to an optimal rejection filter for the precoder for which precoding is implemented at the television transmitter, and providing a filtered output signal;

detecting information regarding the precoder in response to the received output signal, said detecting step comprising selecting the desired one of the plurality of rejection filters in response to the detected information, and providing the selection control signal; and producing a decoded digital television signal in response to the filtered output signal.

7. The method of claim 6, wherein:

said detecting step further comprises detecting information regarding the precoder from a field sync signal which is periodically transmitted by the transmitter, said detecting step comprising calculating a mean-square error between a known field sync signal and a received field sync signal contained within the received output signal, the received field sync signal being utilized in the mean-square error calculation subsequent to the received field sync signal being processed by each of the rejection filters of the plurality of rejection filters, and determining the optimal rejection filter corresponding to that rejection filter which produced a smallest mean-square error of the calculated means-square errors.

8. The method of claim 6, wherein:

said detecting step further comprises detecting information regarding the precoder from a training sequence which is periodically transmitted by the transmitter, said detecting step comprising calculating a mean-square error between a known training sequence and a received training sequence contained within the received output signal, the received training sequence being utilized in the mean-square error calculation subsequent to the received training sequence being processed by each of the rejection filters of the plurality of rejection filters, and determining the optimal rejection filter corresponding to that rejection filter which produced a smallest mean-square error of the calculated means-square errors.

9. The method of claim 6, wherein the transmitter provides information regarding the precoder in reserved data bits of the field sync signal, and wherein:

said detecting step further comprises decoding symbols of the reserved data bits of the field sync signal, said detecting step selecting the desired one of the plurality of rejection filters in response to the decoded symbols.

10. The method of claim 6, wherein the plurality of rejection filters used in said filtering step includes a filter path having no rejection filter therein.

11. An HDTV digital communication system for reducing a co-channel interference in a digital television signal, said system comprising:

a transmitter for transmitting the digital television signal, the transmitted digital television signal having an encoded digital television signal component, a co-channel interference component, and a noise component, said transmitter further having a precoder means for implementing a desired precoding to encode the digital television signal, wherein the precoder means comprises a plurality of precoders, said transmitter further having a selection means for selecting and enabling one of the precoders of the plurality of precoders to facilitate the desired precoding of the digital television signal; and a television receiver, wherein said receiver comprises means for receiving the transmitted digital television signal, said receiving means further providing a received output signal;

filter means for filtering the received output signal to reduce the co-channel interference component thereof, said filter means comprising a plurality of rejection filters, and means, responsive to a selection control signal, for selectively enabling a desired one of said plurality of rejection filters, the enabled rejection filter corresponding to an optimal rejection filter for the precoder for which precoding is implemented at said television transmitter, said filter means providing a filtered output signal;

means, responsive to the received output signal, for detecting information regarding the precoder, said detecting means comprising means for selecting the desired one of the plurality of rejection filters in response to the detected information, said detecting means providing the selection control signal; and means responsive to filtered output signal for producing a decoded digital television signal.

12. The HDTV digital communication system of claim 11, wherein:

said detecting means detects information regarding the enabled precoder from a field sync signal which is periodically transmitted by said transmitter, said detecting means calculating a mean-square error between a known field sync signal and a received field sync signal contained within the received output signal, wherein the received field sync signal is utilized in the mean-square error calculation subsequent to the received field sync signal being processed by each of the rejection filters of the plurality of rejection filters, and determining the optimal rejection filter corresponding to that rejection filter which produced a smallest mean-square error of the calculated means-square errors.

13. The HDTV digital communication system of claim 11, wherein:

said detecting means detects information regarding the enabled precoder from a training sequence which is periodically transmitted by said transmitter, said detection means calculating a mean-square error between a known training sequence and a received training sequence contained within the received output signal, the received training sequence being utilized in the mean-square error calculation subsequent to the received training sequence being processed by each of the rejection filters of the plurality of rejection filters, and determining the optimal rejection filter corresponding to that rejection filter which produced a smallest mean-square error of the calculated means-square errors.

14. The HDTV digital communication system of claim 11, wherein said transmitter provides information regarding the enabled precoder in reserved data bits of the field sync signal, and wherein:

said detecting means further comprises means for decoding symbols of the reserved data bits of the field sync signal, said detection means selecting the desired one of the plurality of rejection filters in response to the decoded symbols.

15. The HDTV digital communication system of claim 11, wherein the plurality of rejection filters of said filter means includes a filter path having no rejection filter therein.

16. The HDTV digital communication system of claim 11, wherein the plurality of precoders of said precoder means includes a precoder path having no precoder therein.

17. A method for reducing a co-channel interference in an HDTV digital communication system for reducing a co-channel interference in a digital television signal, said method comprising the steps:

transmitting the digital television signal, the transmitted digital television signal having an encoded digital television signal component, a co-channel interference component, and a noise component, said step of transmitting further comprising implementing a desired precoding with a precoder means to encode the digital television signal, the precoder means comprising a plurality of precoders, and selecting and enabling one of the precoders of the plurality of precoders to facilitate a desired precoding of the digital television signal;

receiving the transmitted digital television signal and providing a received output signal;

filtering the received output signal to reduce the co-channel interference component thereof, said filtering step comprising using a desired one of a plurality of rejection filters by enabling a desired one of said plurality of rejection filters in response to a selection control signal, said enabled rejection filter corresponding to an optimal rejection filter for the enabled precoder for which precoding is implemented in the television transmitter, and providing a filtered output signal;

detecting information regarding the enabled precoder in response to the received output signal, said detecting step comprising selecting the desired one of the plurality of rejection filters in response to the detected information, and providing the selection control signal; and producing a decoded digital television signal in response to the filtered output signal.

18. The method of claim 17, wherein:

said detecting step further comprises detecting information regarding the enabled precoder from a field sync signal which is periodically transmitted by said transmitting step, said detection step comprising calculating a mean-square error between a known field sync signal and a received field sync signal contained within the received output signal, the received field sync signal being utilized in the mean-square error calculation subsequent to the received field sync signal being processed by each of the rejection filters of the plurality of rejection filters, and determining the optimal rejection filter corresponding to that rejection filter which produced a smallest mean-square error of the calculated means-square errors.

19. The method of claim 17, wherein:

said detecting step further comprises detecting information regarding the enabled precoder from a training sequence which is periodically transmitted by said transmitting step, said detection step comprising calculating a mean-square error between a known training sequence and a received training sequence contained within the received output signal, the received training sequence being utilized in the mean-square error calculation subsequent to the received training sequence being processed by each of the rejection filters of the plurality of rejection filters, and determining the optimal rejection filter corresponding to that rejection filter which produced a smallest mean-square error of the calculated means-square errors.

20. The method of claim 17, wherein said transmitting step further comprises providing information regarding the enabled precoder in reserved data bits of the field sync signal, and wherein:

said step further comprises decoding symbols of the reserved data bits of the field sync signal, said detection step selecting the desired one of the plurality of rejection filters in response to the decoded symbols.

21. The method of claim 17, wherein the plurality of rejection filters used in said filtering step includes a filter path having no rejection filter therein.

22. The method of claim 17, wherein the plurality of precoders used in said step of implementing a desired precoding with a precoder means in said transmitting step, includes a precoder path having no precoder therein.

* * * * *